United States Patent
Braams et al.

[11] Patent Number: 5,850,438
[45] Date of Patent: *Dec. 15, 1998

[54] TRANSMISSION SYSTEM WITH IMPROVED TONE DETECTION

[75] Inventors: Harm Braams, Nieuwegein; Cornelis M. Moerman, Utrecht, both of Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 632,937

[22] Filed: Apr. 16, 1996

[30] Foreign Application Priority Data

Apr. 18, 1995 [EP] European Pat. Off. .............. 95200988

[51] Int. Cl.$^6$ ...................................... H04M 1/00
[52] U.S. Cl. .......................... 379/386; 379/282; 379/351; 704/263
[58] Field of Search ..................... 379/386, 351, 379/282, 283; 395/2.25, 2.26, 2.27, 2.46; 375/351; 455/35, 35.1

[56] References Cited

U.S. PATENT DOCUMENTS

| | | | |
|---|---|---|---|
| 4,064,488 | 12/1977 | Chapman | 379/386 |
| 4,088,960 | 5/1978 | Osborne | 328/144 |
| 4,100,378 | 7/1978 | Classen et al. | 379/351 |
| 4,216,463 | 8/1980 | Backof, Jr. et al. | 340/171 R |
| 4,363,100 | 12/1982 | Agnew et al. | 379/386 |
| 4,769,610 | 9/1988 | Weiss | 364/728.03 |
| 4,783,845 | 11/1988 | McChesney et al. | 455/35 |
| 5,519,774 | 5/1996 | Battista et al. | 379/351 |

OTHER PUBLICATIONS

"ADSI: maximixing the synergy between the network and terminals" by b. Bowles in Telephony, Aug. 29, 1994.

*Primary Examiner*—Ahmad F. Matar
*Assistant Examiner*—Jacques M. Saint-Surin
*Attorney, Agent, or Firm*—Jack D. Sloboo

[57] ABSTRACT

In a transmission system, a tone is transmitted by a transmitter to a receiver via a transmission channel. In the receiver, a tone detector is used to detect the presence of a signalling tone. In order to improve a reliability of the tone detector when the arrival of the signalling tone is unknown, a number of correlators having mutually displaced measuring periods are used. More than two correlators are used in order to reduce the measuring period, also resulting in an improved reliability of the tone detection.

8 Claims, 9 Drawing Sheets

TRANSMISSION SYSTEM WITH IMPROVED TONE DETECTION

BACKGROUND OF THE INVENTION

1. Field of the Invention

The invention is related to a transmission system comprising a transmitter for transmission of a tone via a transmission channel to a receiver, said receiver comprising a detector for detecting the presence of said tone in the received signal.

The invention is also related to a terminal, a tone detector and a method for tone detection.

2. Discussion of the Related Art

A transmission system according to the preamble is known from the journal article "ADSI: maximising the synergy between the network and terminals" by B. Bowles in Telephony, Aug. 29, 1994.

Recently, telephone terminals provided with a display have become available. These telephone terminals are arranged to operate according to the Analogue Display Service Interface standard (ADSI). Said standard enables the transmission of data in addition to the transmission of speech signals to and from the telephone terminal.

In order to distinguish between speech and data a so called CAS-signal (CPE Alerting Signal) is transmitted by the transmitter to indicate that a data signal will be transmitted. The CAS signal is constituted by two tones, having a frequency of 2130 Hz and 2750 Hz, which are transmitted simultaneously during 80 msec. This double tone has to be detected under the presence of speech, making a reliable detection of the double tone rather difficult. Such tone detection can be performed by calculating a correlation value between the received signal and a reference signal. The correlation value is determined during a predetermined measuring time, after which the result is evaluated. If the arrival time of the tone is not known beforehand, it may happen that the result of the calculation of the correlation value is evaluated during the presence of the signalling tone. This will lead to a loss of useful signal energy and consequently to a decreased reliability of the tone detection.

SUMMARY OF THE INVENTION

The object of the invention is to provide a transmission system according to the preamble in which a reliable detection of a tone is assured irrespective of the arrival time of the tone to be detected.

Therefor the invention is characterised in that the detector comprises a correlator for deriving a correlation signal being representative of a correlation value of the input signal and a reference signal, in that the detector comprises at least one additional correlator, and in that the correlator and the additional correlator have mutually displaced measuring periods.

By using an additional correlator, being in the measuring state during a period displaced with respect to a period the correlator is in the measuring state, it can be achieved that one correlator always covers the complete period in which the tone is present. Using more than one additional correlator allows the measuring period to be reduced and still being able to cover the complete period in which the tone is present. The advantage of having a measuring period in the range of the tone duration is that the measurement is only performed if a tone is present. This results in the elimination of a noise contribution to the output signal of the correlator during absence of the tone to be detected. This leads to a more reliable detection of the signalling tone.

It is observed that U.S. Pat. No. 4,216,463 discloses a tone detector in which a correlation signal between an input signal and a reference signal is derived. In this tone detector no additional correlator having a measuring period being displaced with respect to the measuring period of the correlator is used.

An embodiment of the invention is characterised in that the detector comprises three additional correlators, and in that the correlator and the additional correlators have mutually displaced measuring periods.

By using three additional correlators a measuring period which is only 33% larger than the tone duration is sufficient. This choice results in a good compromise between complexity and performance.

BRIEF DESCRIPTION OF THE DRAWINGS

The invention will now be explained more in detail with reference to the drawings; which show in FIG. 1, a transmission system according to the invention.

DETAILED DESCRIPTION OF THE PREFERRED EMBODIMENT

Figure 1:
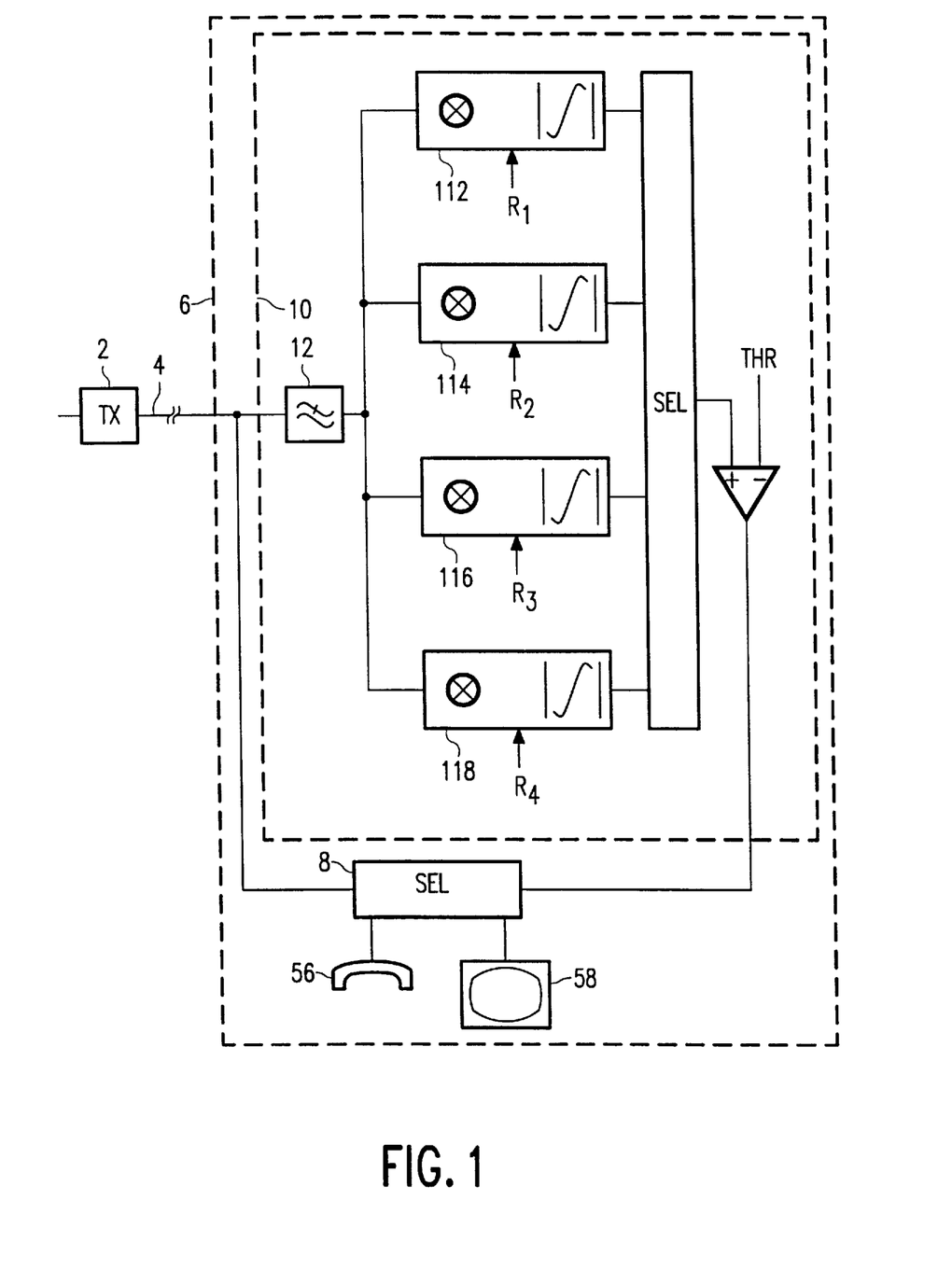

In the transmission system according to FIG. 1 a signal to be transmitted is applied to a transmitter 2. The output of the transmitter 2 carries the signal to be transmitted, possibly in combination with a signalling tone. This output is coupled to a terminal 6 via a transmission channel 4. The input of the terminal 6 is connected to an input of a selector 8 and to an input of a tone detector 10.

The input of the tone detector 10 is connected to an input of a low pass filter 12. The output of the low pass filter 12 is connected to four correlators 112, 114, 116 and 118. To each of the correlators 112, 114, 116 and 118 a corresponding reset signal $R_1$, $R_2$, $R_3$ and $R_4$ is applied. These reset signals are not active simultaneously, but are active tun by turn. The output signals of the correlators 112, 114, 116 and 118 are connected to inputs of a selector 120. The output of the selector 120 is connected to a first input of a comparator 122. A threshold value THR is applied to a second input of the comparator 122. The output of the comparator 122, being also the output of the tone detector 10, is connected to a control input of the selector 8. A telephone handset 56 and an LCD screen 58 are connected to the selector 8.

In the transmission system according to FIG. 1 the transmitted data received by the terminal 6 are applied to the telephone hand set 56 or to the (LCD) display 58 in dependence of the reception of a single signalling tone. A change over is made after the signalling tone is detected by the tone detector 10.

The received signal is filtered by the low pass filter 12 to eliminate interfering signals like noise and speech outside the frequency range corresponding to the signalling tone to be detected.

The tone detector 10 can be used if the arrival time of the tone is not known beforehand. The tone detector 10 comprises a number of correlators which are in the measuring state during mutually displaced measuring periods. In this way there is always at least one correlator which is in the measuring state during the presence of a signalling tone. A condition for this is that the duration of the tone does not exceed the overlap between the measuring periods of two correlators which are reset consecutively.

The correlators 112, 114, 116 and 118 determine in general a product of the input signal and a reference signal. This product is integrated by means of an integrator to obtain the correlation signal. The output signal of the correlator is evaluated after a predetermined measuring period and the integrator is subsequently reset. The selector 120 determines the contents of the integrator present in the correlator at the end of the measuring period and passes this value to the comparator for comparison with the threshold value. Subsequently the correlator is reset by issuing a suitable reset signal. This evaluation and resetting of the correlators is performed cyclically.

Figure 2:
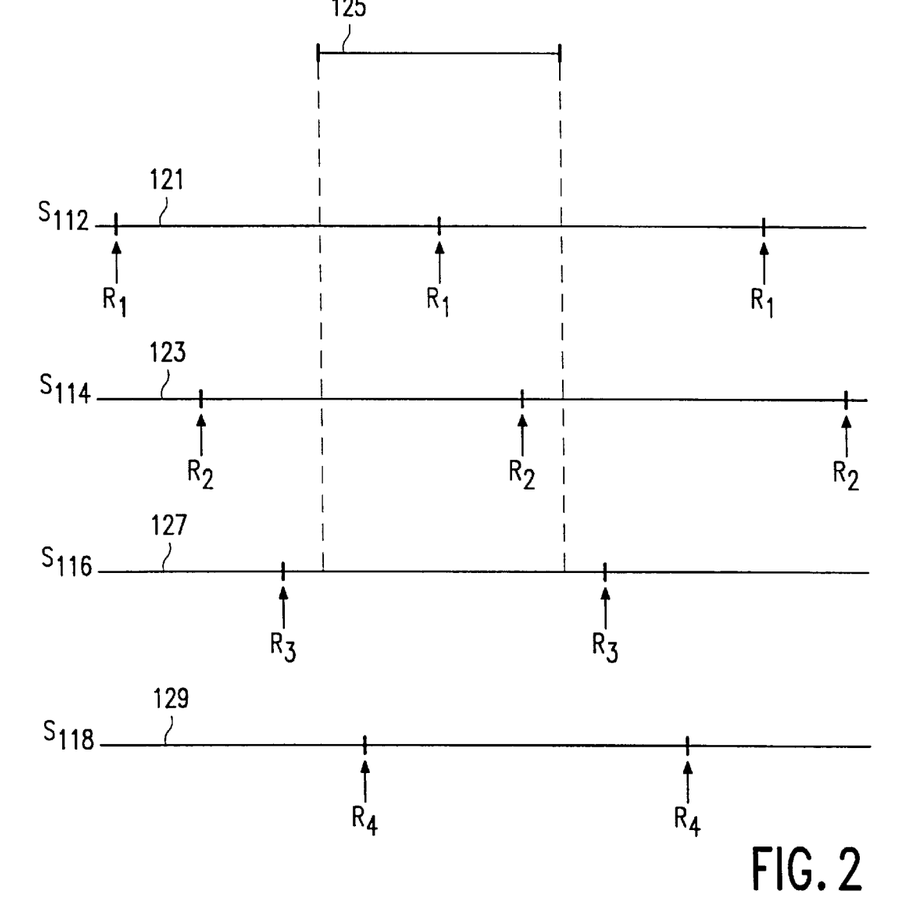
FIG. 2, a timing diagram of the tone detector used in the transmission system according to FIG. 1.

FIG. 2 shows the timing of the evaluation and resetting of the correlators in the tone detector 10 according to FIG. 1. In graph 121 of FIG. 2 the timing of the reset signal $R_1$ applied to the correlator 112 is shown. In graphs 123, 127 and 129 the timing for the reset signals $R_2$, $R_3$, and $R_4$ for the correlators 114, 116 and 118 is shown. From FIG. 5 it is clear that the correlators are evaluated and reset in a cyclic fashion. It can also be seen that there is always one correlator in the measuring state during the presence of a signalling tone of the duration indicated by graph 125, irrespective of the timing of the signalling tone. In general for the relation between the reset interval (or measuring period) $T_m$ and the duration $T_{tone}$ of the signalling tone to be detected can be written:

$$T_m \geq \frac{n}{n-1} T_{tone} \qquad (1)$$

In (1) n is the number of correlators. From (1) it can be seen that the difference between the measuring period and the tone duration is allowed to decrease if the number of correlators increases. The advantage of having a measuring time in the range of the tone duration is that the measurement is only performed if a tone is present. This results in the elimination of a noise contribution to the output signal of the correlator during absence of the tone to be detected. This leads to a more reliable detection of the signalling tone.

Figure 3:
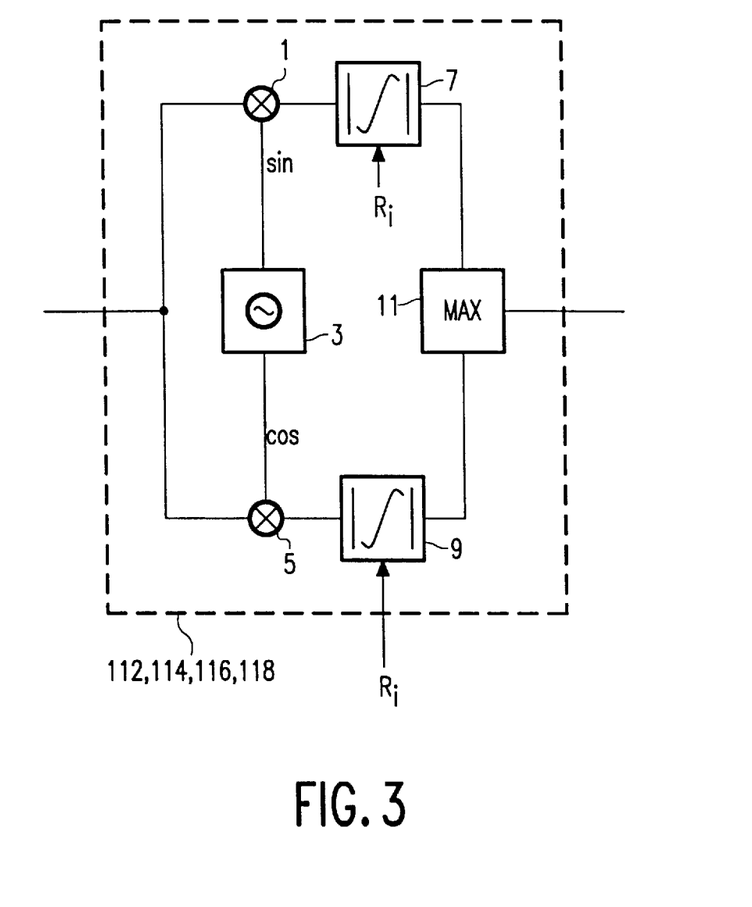
FIG. 3, a first embodiment of the correlators 112, 114, 116 and 118 used in the transmission system according to the transmission system in FIG. 1.

In the correlators 112, 114, 116 and 118 according to FIG. 3, the input is connected to a first input of a multiplier 1 and to a first input of a multiplier 5. A first output of a quadrature signal generator 3, carrying a sine signal, is connected to a second input of the multiplier 1, and a second output of the quadrature signal generator 3, carrying a cosine signal, is connected to a second input of the multiplier 5.

An output of the multiplier 1 is connected to an input of a integrator 7 and an output of the multiplier 5 is connected to an input of a integrator 9. The output of the integrator 7 is connected to a first input of a maximum value determining device 11, and the output of the second squarer 9 is connected to a second input of the maximum value determining device 11. The output of the maximum value determining device 11 constitutes the output of the correlator. A reset signal $R_i$ is applied to a second input of the integrators 7 and 9.

The quadrature signal generator 3 in the correlator according to FIG. 3 is arranged for generating a sine wave signal and a cosine wave signal having a frequency corresponding to the frequency of the tone to be detected. The combination of the multiplier 1 and the integrator 7 determines the correlation between the sine wave generated by the quadrature signal generator 3, and the combination of the multiplier 5 and the integrator 9 determines the correlation between the cosine wave generated by the quadrature signal generator 3. The integrators 7 and 9 are arranged for providing the absolute value of the integrated signals. At the instant the correlation value has to be evaluated, the maximum value determining device 11 passes the output signal of the integrator whose output signals is the largest. By doing so there is always a correlation signal obtained if the frequency of the input signal and the frequency of the signal generated by the quadrature signal generator coincide, irrespective the phase of the input signal of the correlator. After the measuring period is elapsed and the output signal of the correlator is evaluated, the integrators are reset by the reset signal $R_i$.

Figure 4:
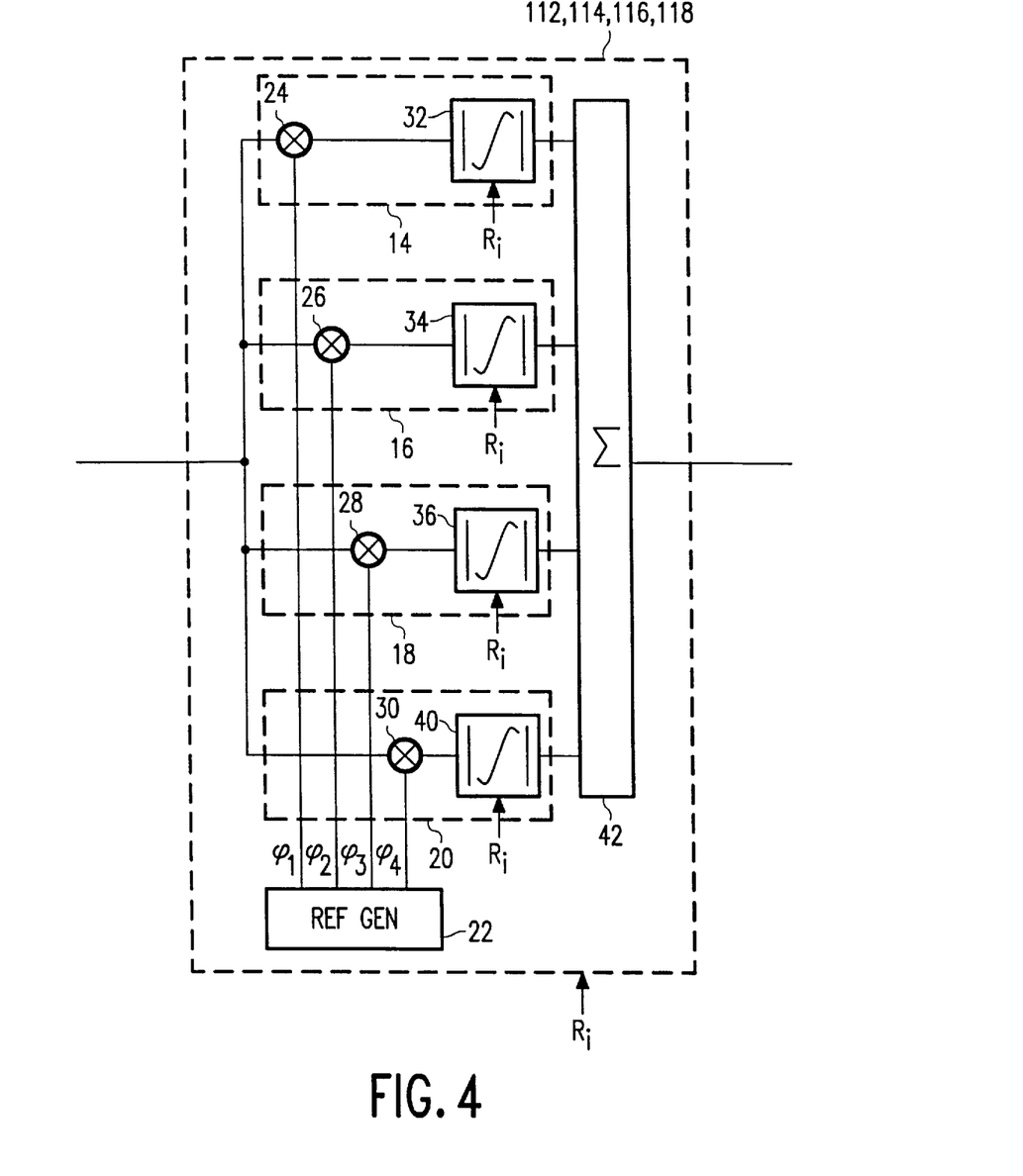
FIG. 4, a second embodiment of the correlators 112, 114, 116 and 118 used in the transmission system in FIG. 1.

The correlators 112, 114, 116 and 118 according to FIG. 4 each comprise correlating elements 14, 16, 18 and 20. The input of the correlating element 14,[16,18,20] is connected to a first input of a multiplier 24,[26,28,30], the output of which is connected to an integrator 32,[34, 36,38]. An output of a reference generator, carrying output signal $\phi_1$,[$\phi_2$,$\phi_3$,$\phi_4$] is connected to a second input of the multiplier 24,[26,28, 30].

The outputs of the correlating elements 14, 16, 18 and 20, carrying partial correlation signals, are constituted by the outputs of the integrators 32, 34, 36 and 40 respectively. These outputs are connected to corresponding inputs of an adder 42. The output of the adder 42 constitutes the output signal of the correlator.

In the correlating elements 14, 16, 18 and 20 of the correlator according to FIG. 4, the output signal of the low pass filter 12 is multiplied with a corresponding reference signal having phase $\phi_1$,$\phi_2$,$\phi_3$ and $\phi_4$. The frequency of the reference signal corresponds to the frequency of the signalling tone to be detected. The integrators 32, 43, 36 and 40 determine the integrated value of the output signal of the corresponding multiplier 24, 26, 28 and 30 respectively, and determine subsequently the absolute value of said integrated value. The partial correlation signals at the outputs of the integrators 32, 34, 36 and 40 are added by the adder 42 to obtain the correlation signal. A correlation signal substantially different from zero will be present if the input signal comprises a signalling tone with a frequency corresponding to the frequency of the reference signal. The tolerated frequency difference depends on the measuring time used. This measuring time used is defined by the time between two subsequent reset instants of the integrators 32 . . . 40. A finite measuring time $T_m$ results in a rectangular window function applied to the output signal of the multipliers. This leads in the frequency domain to a filter function according to:

$$\underline{H}(f) = \frac{\sin(2\pi \underline{T}_m|f - \underline{f}_c|)}{2\pi \underline{T}_m|f - \underline{f}_c|} \qquad (2)$$

The transfer function according to (2) shows a main lobe having width equal to $1/t_m$, leading to a bandwidth of approximately $1/T_m$. By choosing a suitable value for the measuring time, every desired frequency resolution can be obtained. Because the measuring time $T_m$ can easily be changed, the frequency resolution can easily be changed too.

By using four reference signals having a phase incrementing by $\pi/4$, always a major correlation signal is generated, irrespective of the phase of the reference tone. It can be shown that the amplitude variation of the combined correlation signal as function of the phase of the signalling tone, is not more than 10%.

It is conceivable that the partial correlation signals to be added are obtained by weighting the correlation signals with a factor dependent on the actual partial correlation value. This weighting is equivalent to performing a non linear operation on the partial correlation signal. Using such weighting results in a decreased influence of a partial correlation signal having a small magnitude, which can be corrupted by noise.

It is observed that if a double tone is used for signalling, two tone detectors, one for each tone are required. The tone detectors can have the same construction as the detector 10, but have to be designed for different tone frequencies. This can easily be done by changing the frequency of the reference signal. The double tone is regarded as present if both tone detectors indicate the presence of the corresponding tone. In the case of a double tone, the two outputs of the tone detectors are combined in an AND gate, and the output signal of the AND gate is applied to the input of the selector 8.

Figure 5:
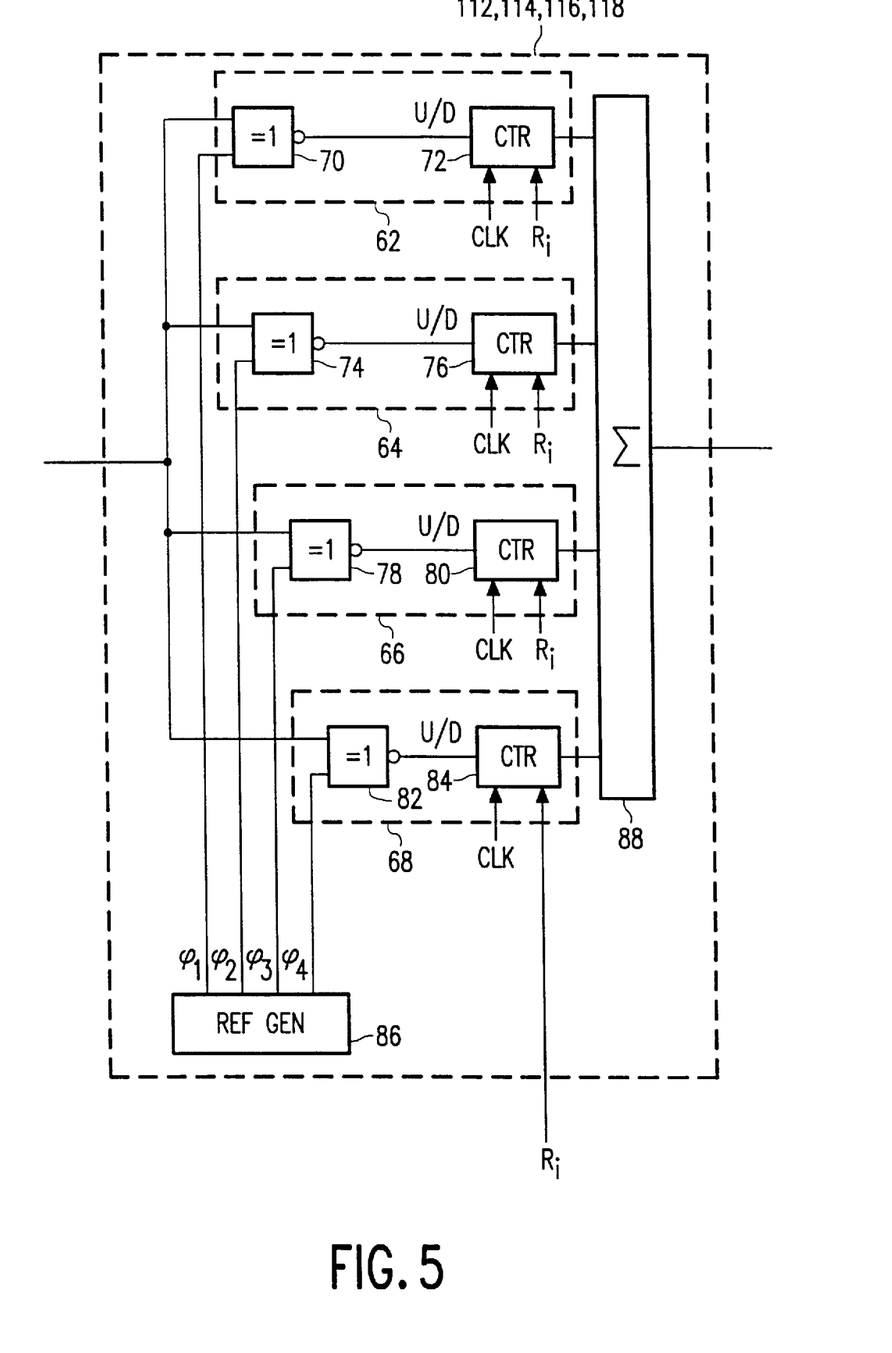
FIG. 5, a digital embodiment of a tone detector to be used in a transmission system according to the invention.

In the correlator according to FIG. 5 the input of the correlator 112, 114, 116 and 118 is constituted by the correlating elements 62, 64, 66 and 68. Said input of the correlating elements 62, 64, 66, 68 is connected to a first input of an exclusive NOR gate 70, 74, 78 and 82 respectively. Second inputs of the exclusive NOR gates 70, 74, 78 and 82 are connected to corresponding outputs of a reference signal generator 86, carrying output signals $\phi_1, \phi_2, \phi_3$ and $\phi_4$. The output of the exclusive NOR gate 70 [74,78,82] is connected to an UP/DOWN control input of an up-down counter 72 [76,80,84]. To each of the up-down counters 72, 76, 80 and 84 a clock signal and a reset signal are applied. The outputs of the up-down counters 72, 76, 80 and 84, each carrying an output signal corresponding to the absolute value of the count value, are connected to an input of an adder 88. The output of the adder 88 constitutes the output of the correlator.

The input signal of the correlator according to FIG. 5 is derived from the output of the low pass filter 12 in FIG. 1 by a slicing operation to obtain a binary signal. Said binary signal is compared in each of the correlating elements 62, 64, 66 and 68 to a corresponding binary reference signal generated by the reference signal generator 86. The reference signals generated by the reference signal generator have a mutual phase difference of $\pi/4$. The comparison of the output signal from the slicer 60 to the reference signals is performed by the exclusive NOR gates 70, 74, 78 and 82. The output signal of an exclusive NOR gate has a logical value "0" if both input signals have a different logical value, and has a logical value "1" if both input signals have an equal logical value.

The output signals of the respective exclusive NOR gates 70, 74, 78 and 82 control the counting direction of corresponding up-down counters 72, 76, 80 and 84. If the input signal of the correlator has the same logical value as the reference signal, the up-down counter will increase its count at every clock pulse. If the input signal of the correlator has a logical value differing from the logical level of the reference signal, the up-down counter will decrease its count at every clock pulse. If the reference signal has approximately the same phase and frequency as the output signal of the slicer, the count of the up-down counter will rapidly increase, indication a large (positive) correlation value. If the reference signal has approximately the same frequency as the input signal of the correlator, but is opposite in phase with respect to the input signal of the correlator, the count of the up-down counter will rapidly decrease, indication a large (negative) correlation value. If there is no correlation between the reference signal and the input signal of the correlator, the output signal of the exclusive NOR gate will more or less randomly assume the logical value "0" or "1". This means that the up-down counter will increase and decrease its count in a random fashion, leading to an average count of zero.

The absolute values of the counts of the up-down counters 72, 76, 80 and 84 are summed periodically by the adder 88 and passed to the comparator 90 which compares the output signal of the adder 88 to a threshold value THR. After the addition of the absolute values of the counts, the up-down counters 72, 76, 80 and 84 are reset by a reset signal $R_i$.

The clock frequency is in general a multiple of the frequency of the tone to be detected. This results in an improved suppression of interfering components in the input signal of the correlator. If the input signal of the correlator sometimes has a wrong logical value due to an interfering signal, in half of the cases a "0" is changed in a "1", and in half of the cases a "1" is changed in a "0". These errors tend to have an average value of zero if a large number of clock cycles is present per period of the reference signal.

Figure 6:
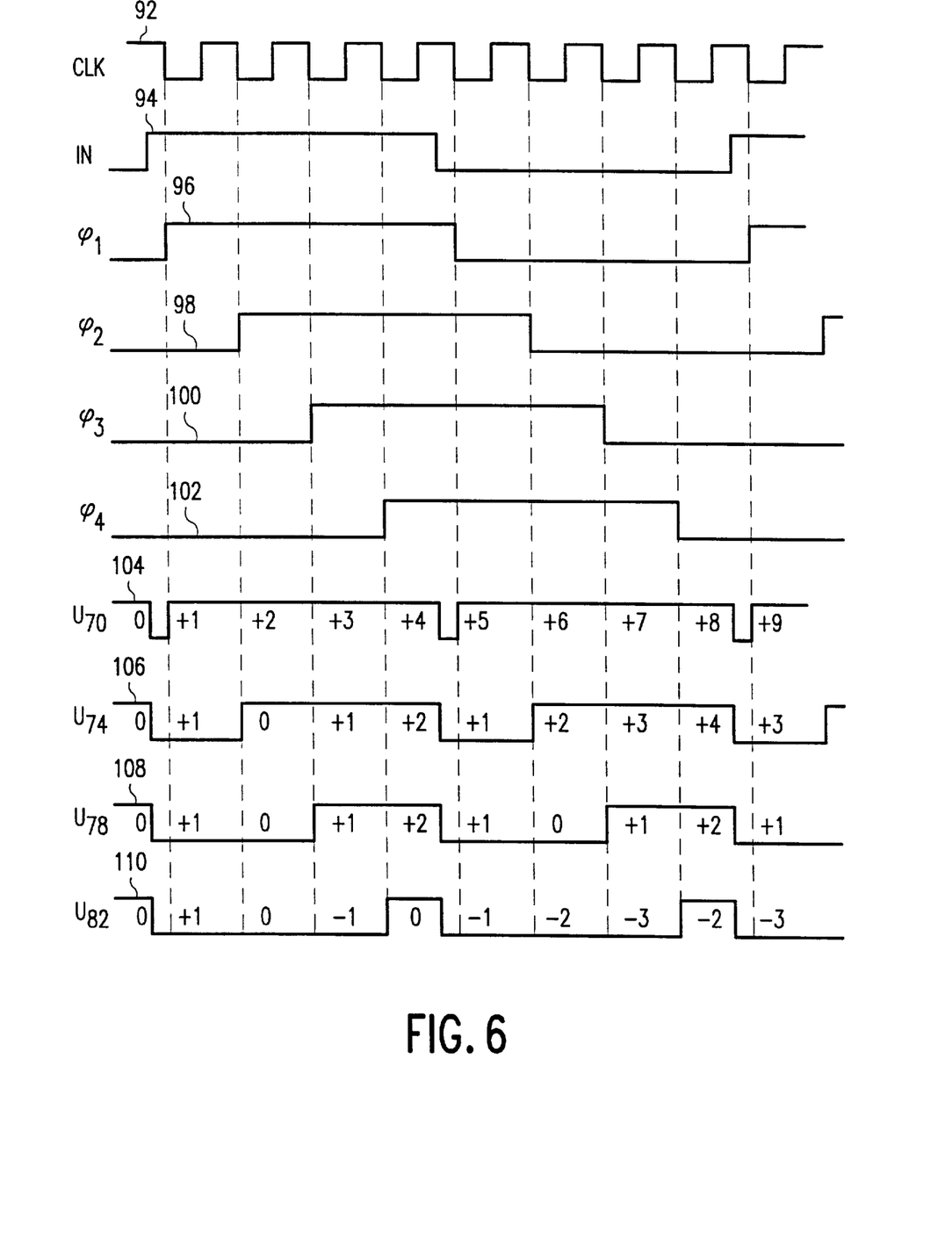
FIG. 6, a timing diagram of several signals in the tone detector according to FIG. 5.

FIG. 6 shows a number of waveforms present in the tone detector according to FIG. 2. Graph 92 shows the clock signal CLK applied to the up-down counters 72, 76, 80 and 84. Graph 94 shows an input signal of the correlator. Graphs 96, 98, 100 and 102 show the reference signals $\phi_1, \phi_2, \phi_3$ and $\phi_4$. It can be seen that the frequency of the clock signal CLK is 8 times the frequency of the reference signals. As explained above, this leads to an improved suppression of interfering signals.

Graph 104 shows the output signal of the exclusive NOR gate 70. Said output signal has during most of the time a logical value "1". In graph 104 the count of up-down counter 72 is given as function of time. It can be seen that at every clock pulse of the clock signal CLK the count is incremented by 1. Before the first clock pulse the count value is equal to zero, and at the final clock pulse the count is increased to +9.

Graph 106 shows the output signal of the exclusive NOR gate 74. In said output signal both logical values "0" and "1" appear, but the logical value "1" dominates slightly. In graph 106 the count of up-down counter 76 is given as function of time. It can be seen that the count increases if the output signal of the exclusive NOR gate has a value "1" and that the count decreases if the value of the output signal of the NOR gate has the value "0". The count of up-down counter 76 increases with time, but less rapidly as the count of up-down counter 72. The final value is here +3.

Graph 108 shows the output signal of the exclusive NOR gate 78. The logical values "0" and "1" appear during an almost equal amount of time. This results in alternatively counting up and down by the up-down counter 80. The final result is a count value of +1.

Graph 110 shows the output of the exclusive NOR gate 78. Here the logical value "0" dominates, resulting in counting down of the up-down counter 84 in most of the cases, resulting in a final count of −3.

If the absolute values of the final counts of the up-down counters 72, 76, 80 and 84 are added a value of 16 is found, clearly indicating the presence of the tone to be detected.

Figure 7:
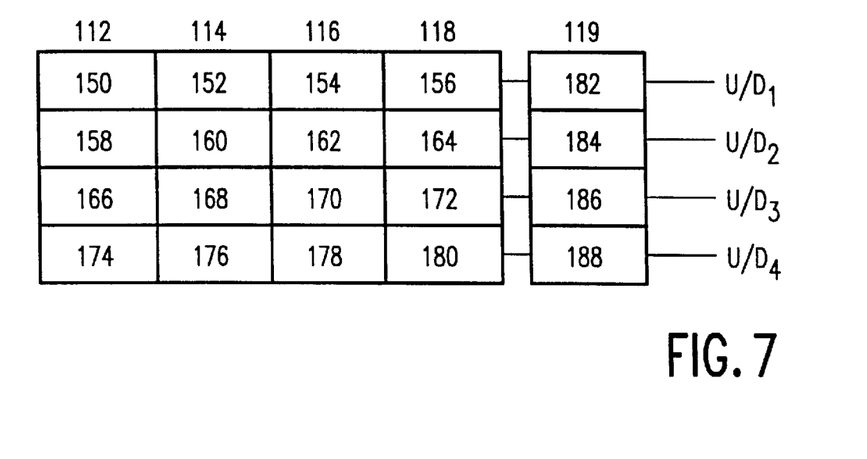
FIG. 7, an alternative arrangement of the counters to be used in the tone detector according to FIG. 6.
Figure 8:
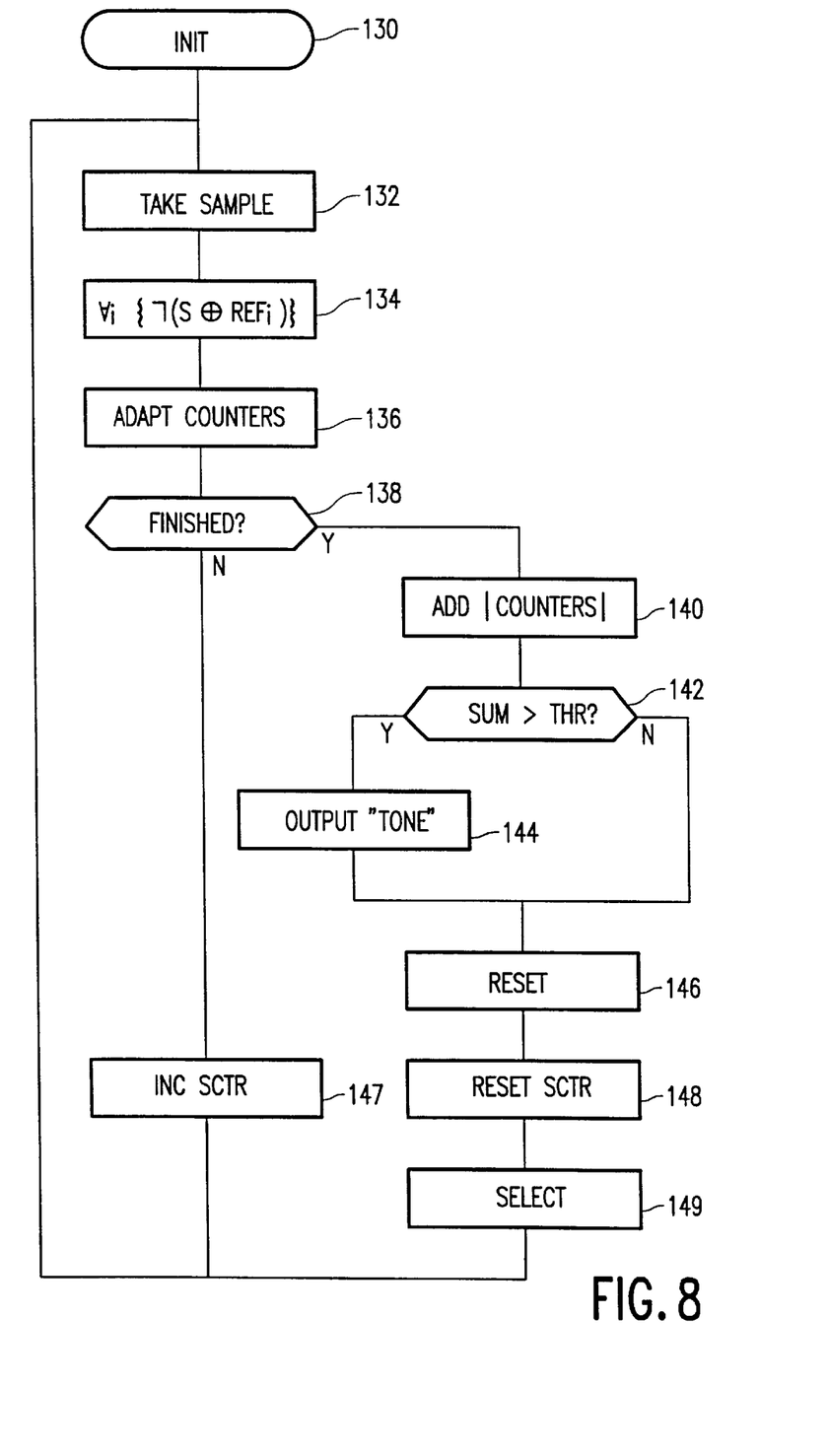
FIG. 8, a flow diagram of a software implementation of the tone detector according to FIG. 5.

FIG. 7 shows an alternative implementation of the tone detector according to FIG. 5 using a multiple of correlators. The arrangement according to FIG. 7 comprises a first set of memory cells comprising memory cells 150, 158, 166 and 174, a second set of memory cells 114 comprising memory cells 152, 160, 168 and 176, a third set of memory cells 116 comprising memory cells 154, 162, 170 and 178 and a fourth set of memory cells 118 comprising memory cells 156, 164, 172 and 180. Each set of memory cells corresponds to one correlator. The arrangement comprises one set of counters 119 comprising counters 182, 184, 186 and 188. These counters are updated once per period of the clock signal CLK. The direction of the update is determined by the up/down signals generated by the exclusive NOR gates 70, 74, 78 and 82 in FIG. 5.

At the instant where the correlator 112 has to be evaluated, the following subtractions are performed: the count of the counter 182 minus the contents of memory cell 150, the count of counter 186 minus the contents of memory cell 166 and the count of counter 188 minus the contents of the memory cell 174. The absolute values of said subtractions are added and used as the correlation value. Subsequently the count of the counter 182 is copied into the memory cell 150, the count of the counter 184 is copied into memory cell 158, the count of the counter 186 is copied into the memory cell 160 and the count of the counter 188 is copied into the memory cell 174. This copy operation corresponds to the resetting at the instant associated with $R_1$ of the set of counters 112 in FIG. 4. It is observed that the counters 182, 184, 186 and 188 in the set of counters 119 are never reset. The same is done with the set of counters 11, 116 and 118 at instants associated with the reset signals $R_2$, $R_3$ and $R_4$ respectively. The advantage of this way of processing is a reduction of the amount of computational complexity, in exchange to somewhat increased memory requirements.

In the flow diagram according to FIG. 7, the inscriptions of the blocks have the following meaning:

| No. | INSCRIPT | MEANING |
|---|---|---|
| 130 | INIT | All used variables are set to their initial value. |
| 132 | TAKE SAMPLE | A sample of the sliced input signal is taken. |
| 134 | $\forall_i \{ \neg (S \oplus \underline{REF_i}) \}$ | The exclusive NOR operation is performed on the sliced input signal and all i reference signal. |
| 136 | ADAPT COUNTERS | The counters are adapted in response to the result of the exclusive NOR operations. |
| 138 | FINISHED? | It is checked whether a correlator has been active for the prescribed measuring time. |
| 140 | ADD \|COUNTERS\| | The sum of the counters in the correlator that has to be evaluated is calculated. |
| 142 | SUM > THR? | Is the sum of the absolute value of the counts larger than THR? |
| 144 | OUTPUT "TONE" | An indication of the presence of the tone to be detected is presented at the output of the detector. |
| 146 | RESET SET | Reset all counters of the set just evaluated. |
| 147 | INC SCTR | Increment sample counter SCTR. |
| 148 | RESET SCTR | Reset sample counter SCTR. |
| 149 | SELECT | Select next correlator to be evaluated. |

In the program according to the flow diagram in FIG. 7 a number of counters equal to the number of reference signals is used in each correlator. These counters are all set to zero in instruction 130. In instruction 132 the exclusive NOR value of all reference signals and the sliced input signal is calculated, resulting in a number of exclusive NOR values equal to the number of reference signals. In instruction 136 all counters are adapted in response to the calculated exclusive NOR value. In each correlator the counters associated with exclusive NOR value with logical value "0" are decremented, and the counters associated with exclusive NOR value with logical value "1" are incremented.

In instruction 138 it is checked whether there has a correlator to be evaluated, due to expiration of the measuring time. This check is performed by checking the value of a sample counter SCTR. If this counter has reached a predetermined value a correlator has to be evaluated.

In instruction 140 the absolute values of the counts of the counters of the correlator to be evaluated are added. In instruction 142 it is checked whether this sum exceeds a threshold value THR. If the sum exceeds the threshold value an indication of the presence of the tone to be detected is presented at the output of the detector in instruction 144. In instruction 146 all counters of the correlator just evaluated are reset, and in instruction 148 the sample counter SCTR is reset. In instruction 149 the next correlator to be evaluated is selected. This selection is done in such a way that all correlators are evaluated cyclically. The correlators are allowed to run a predetermined number of samples before they are evaluated again.

If it is determined in instruction 138 that no evaluation of a correlator has to be performed yet, the sample counter SCTR is incremented in instruction 147. After finishing instruction 147 or instruction 149 the program jumps to instruction 132 to take the next sample of the input signal.

To increase the processing speed of the program discussed, it is possible to transfer in instruction 140 the counter values to be evaluated to additional variables and to continue at instruction 146. For the evaluation of the values in the additional variables now a complete measuring period of one correlator is available. By using this modification the sample rate can be increased substantially, or the processing power of the processor to be used can be decreased accordingly.

The tone detector according to the invention is very suitable to be implemented in software for a programmable processor. The parameters of the tone detector (tone frequency, frequency resolution) can very easily be changed by altering only the value of a few constants. The result is a versatile, reliable tone detector with a low implementation complexity.

Figure 9:
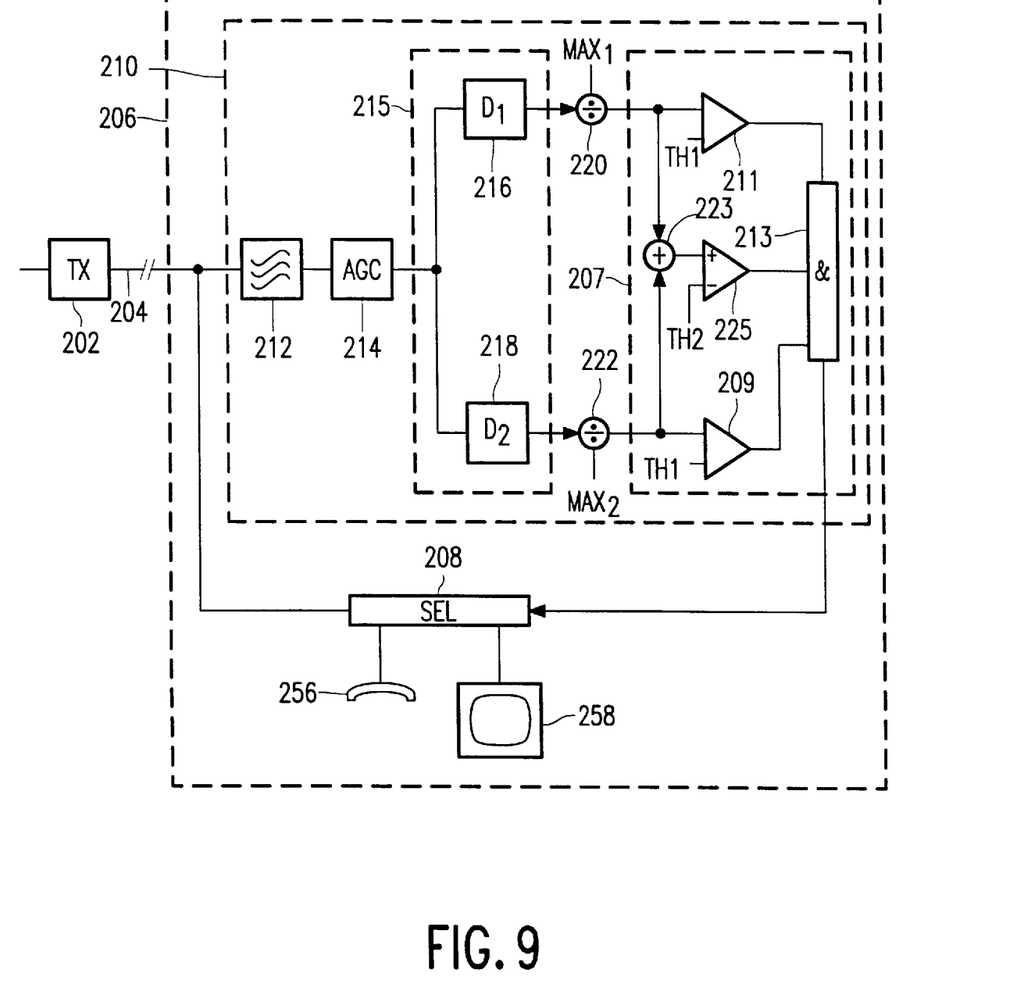
FIG. 9, a transmission system according to a still further embodiment of the invention.

In the transmission system according to FIG. 9, a signal to be transmitted is applied to a transmitter 202. The output of the transmitter 202 carries the signal to be transmitted, possibly in combination with a signalling tone. This output is coupled to a terminal 206 via a transmission channel 204. The input of the terminal 206 is connected to an input of a selector 208 and to an input of a tone detector 210.

The input of the tone detector 210 is connected to an input of a low pass filter 212. The output of the low pass filter 212 is connected to an AGC circuit 214. The output of the AGC circuit 214 is connected to an input of a strength measuring means 215. The input of the strength measuring means 215 is connected to a first input of a first tone strength measuring device 216 and to an input of a second tone strength measuring device 218.

The output of the first tone strength measuring device 216 is connected to a first input of a divider 220. A signal $MAX_1$, representing the maximum value of the output signal of the strength measuring device 216, is connected to a second input of the divider 220.

The output of the second tone strength measuring device 218 is connected to a first input of a divider 222. A signal MAX$_2$, representing the maximum value of the output signal of the strength measuring device 218, is connected to a second input of the divider 222.

The output of the divider 220 is connected to a first input of the decision means 227. The first input of the decision means 227 is connected to a first input of a comparator 211 and to a first input of an adder 223. The output of the divider 22 is connected to a second input of the decision means 227. The second input of the decision means 227 is connected to a first input of a comparator 229 and to a second input of an adder 223. The output of the adder 223 is connected to a first input of a comparator 225. A first reference signal TH$_1$ is applied to a second input of the comparator 211 and to a second input of the comparator 229. A second reference signal TH$_2$ is applied to a second input of the comparator 226.

An output of the comparator 211, the comparator 225 and the comparator 229 are connected to a corresponding input of an AND gate 213. The output of the AND gate 213 is connected to a control input of the selector 228. A telephone handset and an LCD screen 258 are connected to the selector 228.

The transmission system according to FIG. 9, is especially arranged for dealing with dual tone signals having a difference in strength, also called twist. In the transmission system according to FIG. 9 the data to be transmitted, is transmitted by the transmitter 202 via the transmission medium 204 to the terminal 206. In the terminal 206 the transmitted data received by the terminal 206 is applied to the telephone hand set 256 or to the (LCD) display 258 in dependence of the reception of two signalling tones. A change over is made after the signalling tone signals are detected by the tone detector 210.

The received signal is filtered by the low pass filter 212 to eliminate interfering signals like noise and speech outside the frequency range corresponding to the signalling tone to be detected. The AGC circuit provides an output signal having a constant output power to the input of the tone strength measuring devices 216 and 218.

The strength measuring device 216 is arranged for generating a strength measure for the first tone, and the strength measuring device 218 is arranged for generating a strength measure for the second tone. The strength measuring devices 216 and 218 comprise correlators according to FIG. 1, FIG. 2, FIG. 4, FIG. 5 or FIG. 7 and 8. In the case of a CAS signal used in the above mentioned ADSI standard, the first tone has a frequency of 2130 Hz and the second tone has a frequency of 2750 Hz. The output signal of the tone strength measuring device 216 is normalised by the divider 220 with respect to the maximum possible output signal of said tone strength measuring device 216. This means that the output of the divider 220 varies between 0 and a predetermined constant value. This normalisation is done in order to obtain strength measures having the same range for both tone signals irrespective of (frequency determined) differences between the strength signals from the strength measuring devices 216 and 218.

At the output of the adder 223, a combined strength measure is available. The comparator 225 compares the combined strength measure with the reference value TH$_2$. The comparators 227 and 231 compare the strength measures at the outputs of the dividers 220 and 222 respectively with the reference value TH$_1$. If it is assumed that the maximum output signal of the dividers 220 and 222 is equal to 221, suitable values for the threshold value TH$_1$ and TH$_2$ are 0.24 and 0.8 respectively. Only if all three threshold values are exceeded, the tone pair is regarded as present by the AND gate 213, resulting in an improved reliability of the decision in the case that the two tone signals differ in strength.

It is observed that it is possible to dispense with the comparators 211 and 229. This will lead to less accurate limits set on the required value of the individual strength measures, but there is still the advantage of an improved reliability of the detection due to the higher value of TH$_2$.

Figure 10:
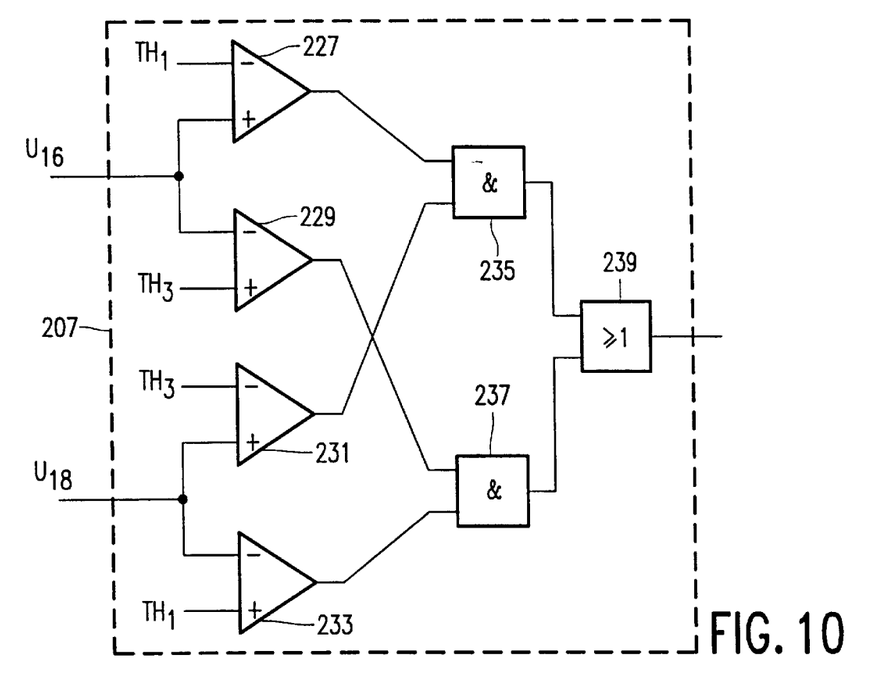
FIG. 10, an alternative for the decision element 207 according to FIG. 8.

In the decision circuit 227 according to FIG. 10, the first input is connected to a first input of a comparator 227 and to a first input of a comparator 229. A second input of the decision circuit 227 is connected to a first input of a comparator 231 and to a first input of a comparator 233. A first reference signal TH$_1$ is applied to a second input of the comparator 227 and to a second input of the comparator 233. A third reference signal TH$_3$ is applied to a second input of the comparator 229 and to a second input of the comparator 231.

The output of the comparator 227 is connected to a first input of an AND gate 235 and the output of the comparator 231 is connected to a second input of the AND gate 235. The output of the comparator 229 is connected to a first input of an AND gate 237 and the output of the comparator 231 is connected to a second input of the AND gate 237. The output of the AND gate 235 is connected to a first input of an OR gate 239, and the output of the AND gate 237 is connected to a second input of the OR gate 239. The output of the OR gate 239 constitutes the output of the decision means 227.

In the decision circuit according to FIG. 10 it is assumed that the reference value TH$_1$ is substantially smaller than TH$_3$. Possible values of TH$_1$ and TH$_3$ are 0.2 and 0.4–0.5 respectively. The output of the AND gate 235 will be "1" if and only if the normalised strength measure U$_{16}$ exceeds TH$_1$ and the normalised strength measure U$_{18}$ exceeds TH$_3$. The output of the AND gate 237 will be "1" if and only if the normalised strength measure U$_{18}$ exceeds TH$_1$ and the normalised strength measure U$_{16}$ exceeds TH$_3$. This means that the output of one of the AND gates 235 or 237 is "1" if the strength of one of the tone signals exceeds a value 0.8 and the other one exceeds 0.2. Consequently the output of the OR gate 239 will be "1" under these conditions. The reliability of the detection of the tone pair has substantially increased with respect to the prior art device, because in the prior art device it was necessary to set the threshold value for both tone signals on the same low level (e.g. 0.2). It is observed that in case the tone pair is detected by the decision circuit according to FIG. 10, the combined tone strength measure is larger than 1. Consequently the decision means according to FIG. 10 operates on basis of the combined strength measure without actually calculating it.

Figure 11:
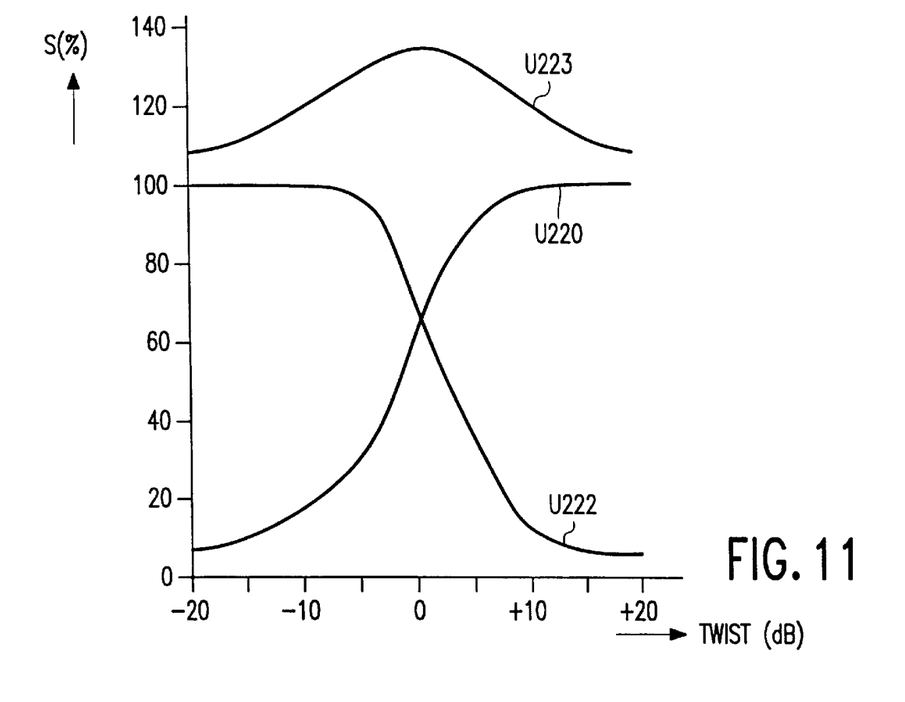
FIG. 11, the output signals of the strength measuring devices 216 and 218 as function of the twist.

FIG. 11 shows the first normalised strength signal U$_{20}$, the second normalised output strength signal U$_{22}$ and the sum of the first and the second normalised strength signals. These normalised strength signals are calculated by the divider 220, the divider 222 and the adder 223 respectively. From FIG. 11 it can be seen that in the case of a zero twist value the normalised strength signals U$_{20}$ and U$_{22}$ both have a value of 0.64. The sum of these signals is 1.32. A suitable threshold value TH$_2$ is 0.8, and a suitable threshold value TH$_1$ is 0.24. With these choice a twist of 6 dB is tolerated by the tone detector. If only the combined threshold signal is compared with a reference value, this reference value has to be larger than 1, in order to prevent detection of a single tone as the combination of tone signals. A suitable choice could be a value of 1.2.

We claim:

1. A transmission system comprising a transmitter for transmission of a tone via a transmission channel to a receiver, said receiver comprising a detector for detecting a presence of the tone in a received signal, wherein the detector comprises a correlator for deriving a correlation signal being representative of a correlation value of an input signal and a reference signal, wherein the detector further comprises at least one additional correlator, and wherein the correlator and the additional correlator have overlapping measuring periods mutually displaced in time.

2. The transmission system according to claim 1, wherein the detector comprises three additional correlators, and wherein the correlator and the additional correlators have overlapping measuring periods mutually displaced in time.

3. A terminal comprising a detector for detecting a presence of a tone in a received signal, wherein the detector comprises a correlator for deriving a correlation signal being representative of a correlation value of an input signal and a reference signal, wherein the detector further comprises at least one additional correlator, and wherein the correlator and the additional correlator have overlapping measuring periods mutually displaced in time.

4. The terminal according to claim 3, wherein the detector comprises three additional correlators, and wherein the correlator and the additional correlators have overlapping measuring periods mutually displaced in time.

5. A detector for detecting a presence of a tone in an input signal, the detector comprising a correlator for deriving a correlation signal being representative of a correlation value of the input signal and a reference signal; and at least one additional correlator, wherein the correlator and the additional correlator have overlapping measuring periods mutually displaced in time.

6. The detector according to claim 5, wherein the detector comprises three additional correlators, and wherein the correlator and the additional correlators have overlapping measuring periods mutually displaced in time.

7. A method for detecting a presence of a tone in an input signal, said method comprising the steps of: deriving a correlation signal being representative of a correlation value of the input signal and a reference signal; and deriving an additional correlation signal being representative of a correlation value of the input signal and a reference signal, wherein the derivation of the correlation signal and the additional correlation signal takes place during overlapping measuring periods mutually displaced in time.

8. The method according to claim 7, wherein the step of deriving an additional correlation signal comprises deriving three additional correlation signals, wherein the derivation of the correlation signal and the three additional correlation signals takes place during overlapping measuring periods mutually displaced in time.

* * * * *